US012791120B2

(12) United States Patent
Parzych

(10) Patent No.: US 12,791,120 B2
(45) Date of Patent: Nov. 10, 2026

(54) PREDICTIVE MAINTENANCE METHOD AND SYSTEM

(71) Applicant: SCHIVO MEDICAL LIMITED, Waterford (IE)

(72) Inventor: Krzysztof Parzych, Burlington, CT (US)

(73) Assignee: SCHIVO MEDICAL LIMITED, Waterford (IE)

( * ) Notice: Subject to any disclaimer, the term of this patent is extended or adjusted under 35 U.S.C. 154(b) by 59 days.

(21) Appl. No.: 18/657,071

(22) Filed: May 7, 2024

(65) Prior Publication Data

US 2024/0376999 A1 Nov. 14, 2024

Related U.S. Application Data

(60) Provisional application No. 63/618,646, filed on Jan. 8, 2024, provisional application No. 63/500,628, filed on May 8, 2023.

(51) Int. Cl.
*F16K 37/00* (2006.01)
*F16K 31/04* (2006.01)

(52) U.S. Cl.
CPC .......... *F16K 37/0083* (2013.01); *F16K 31/04* (2013.01); *F16K 37/0041* (2013.01); *F04B 2203/0201* (2013.01)

(58) Field of Classification Search
None
See application file for complete search history.

(56) References Cited

U.S. PATENT DOCUMENTS

| | | | | |
|---|---|---|---|---|
| 8,967,199 B2 * | 3/2015 | Blieske | F16K 11/087 | 137/625.21 |
| 2015/0149100 A1 * | 5/2015 | Eisenbeis | F16K 37/0041 | 702/58 |

FOREIGN PATENT DOCUMENTS

| | | | |
|---|---|---|---|
| WO | WO-9103349 A1 * | 3/1991 | B23G 1/18 |

* cited by examiner

*Primary Examiner* — Atif H Chaudry
(74) *Attorney, Agent, or Firm* — BCF LLP

(57) ABSTRACT

According to some embodiments, a system and method associated with predictive maintenance of a pump and/or valve is disclosed. The method includes monitoring a force in the valve or the pump via an onboard motion controller. Based on the monitored force, a change in a current draw associated with a motor moving a rotor in the valve or a shaft in the pump is determined. It is also determined if the change in current draw is within an acceptable range. In a case that the change in current draw is within the acceptable range, the force is continued to be monitored. In a case that the change in current draw is outside of the acceptable range, an indication is transmitted to a user.

14 Claims, 5 Drawing Sheets

200

300

400

PREDICTIVE MAINTENANCE METHOD AND SYSTEM

BACKGROUND

Many complex systems use pumps and valves (e.g., shear valves) as a component of the system. When a pump or valve fails (e.g., leaking or does not provide a desired output), the whole system may fail causing delays as well as requiring technicians to be called to change parts. These repairs can be costly and can create significant downtime to the system. Therefore, a method and system to predict when maintenance of valves and pumps is required is desirable.

SUMMARY

Some embodiments described herein relate to a system and method associated with predictive maintenance of a pump and/or valve. The method includes monitoring a force in the valve or the pump via an onboard motion controller. Based on the monitored force, a change in a current draw associated with a motor moving a rotor in the valve or a shaft in the pump is determined. It is also determined if the change in current draw is within an acceptable range. In a case that the change in current draw is within the acceptable range, the force is continued to be monitored. In a case that the change in current draw is outside of the acceptable range, an indication is transmitted to a user.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The embodiments described herein relate to a system and method for predicting when maintenance will be required for an apparatus such as, but not limited to a valve (e.g., a shear valve) and a pump. Instead of using additional sensors which add to cost and complexity, the embodiments described herein relate to calculating force via an onboard load measuring software such as, but not limited to, StallGuard™. The load measuring software may comprise a sensorless load measurement designed for stepper motors (i.e., stall detection technology). The sensorless technology may detect up to 1024 different load levels and then provide feedback in a form of a current draw for continuous monitoring of a valve or pump.

The embodiments described herein may further relate to a method of predictive maintenance measurements associated with load value detection in a stepper motor that is created and transferred via shafts, unions, material frictions, positive stop impact resistance detected between a rotor, a stator, a plunger, and/or a piston. During movement of a rotor or plunger (e.g., a shaft) a logarithm logic and integrated circuit may monitor StallGuard™ values as an indication of the relative torque forces required to rotate or vertically move the load on the motor. The initial StallGuard™ values may then be recorded and stored in memory. After every subsequent motion the StallGuard™ values may be reported and tracked. If a relative torque value measured is decreased by a predetermined positive or a predetermined negative percentage value of the original measured value, the StallGuard™ values may be stored in a wear log (e.g., a database) located in an integrated memory circuit. The integrated memory circuit may be an on-board integrated memory circuit. When a value falls below a predetermined threshold the result may be stored in memory and a user may be notified that a valve (comprising a rotor and stator) or pump has reached a maximum allowable wear.

Figure 1:
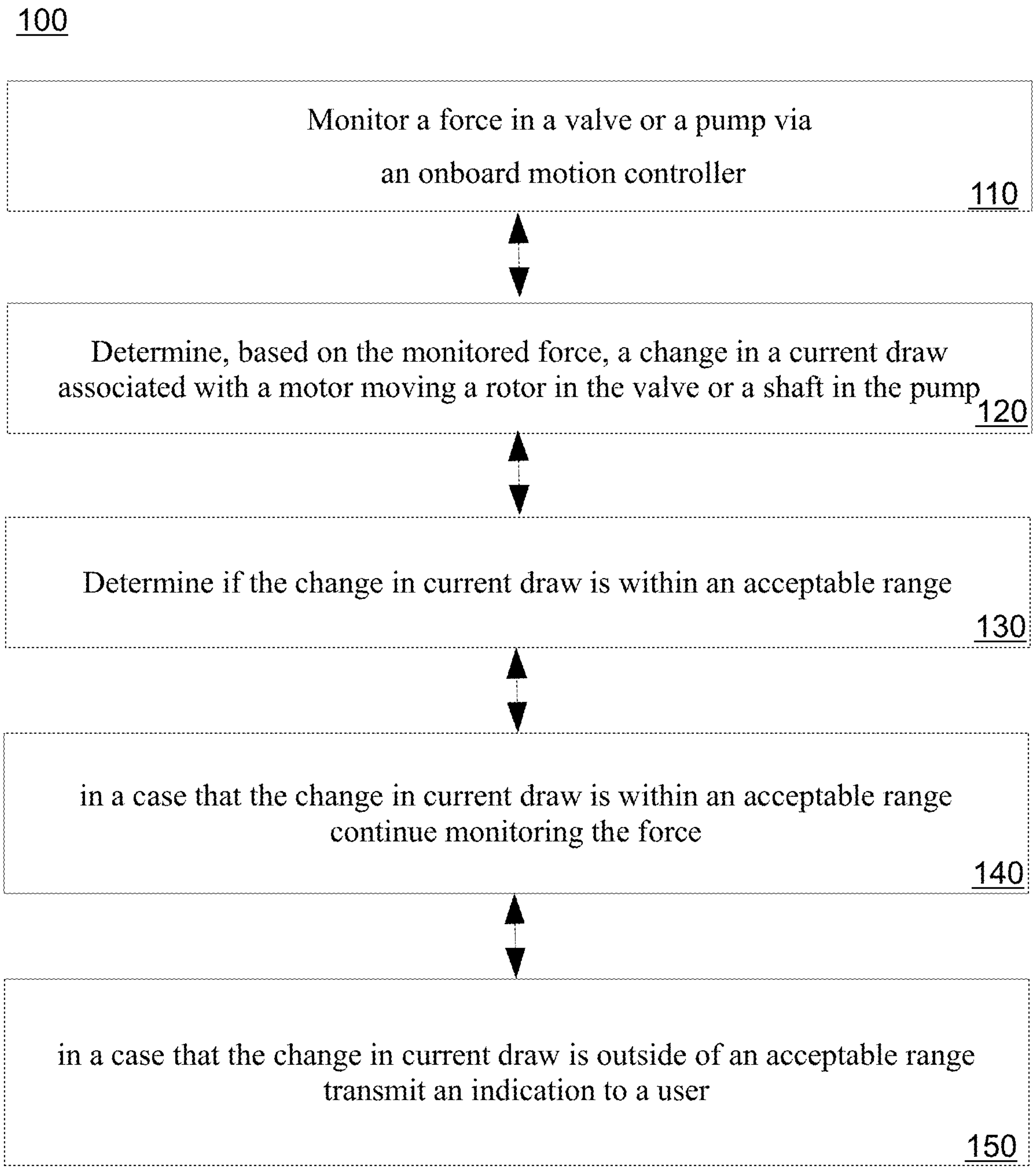
FIG. 1 illustrates a method in accordance with some embodiments.
Figure 5:
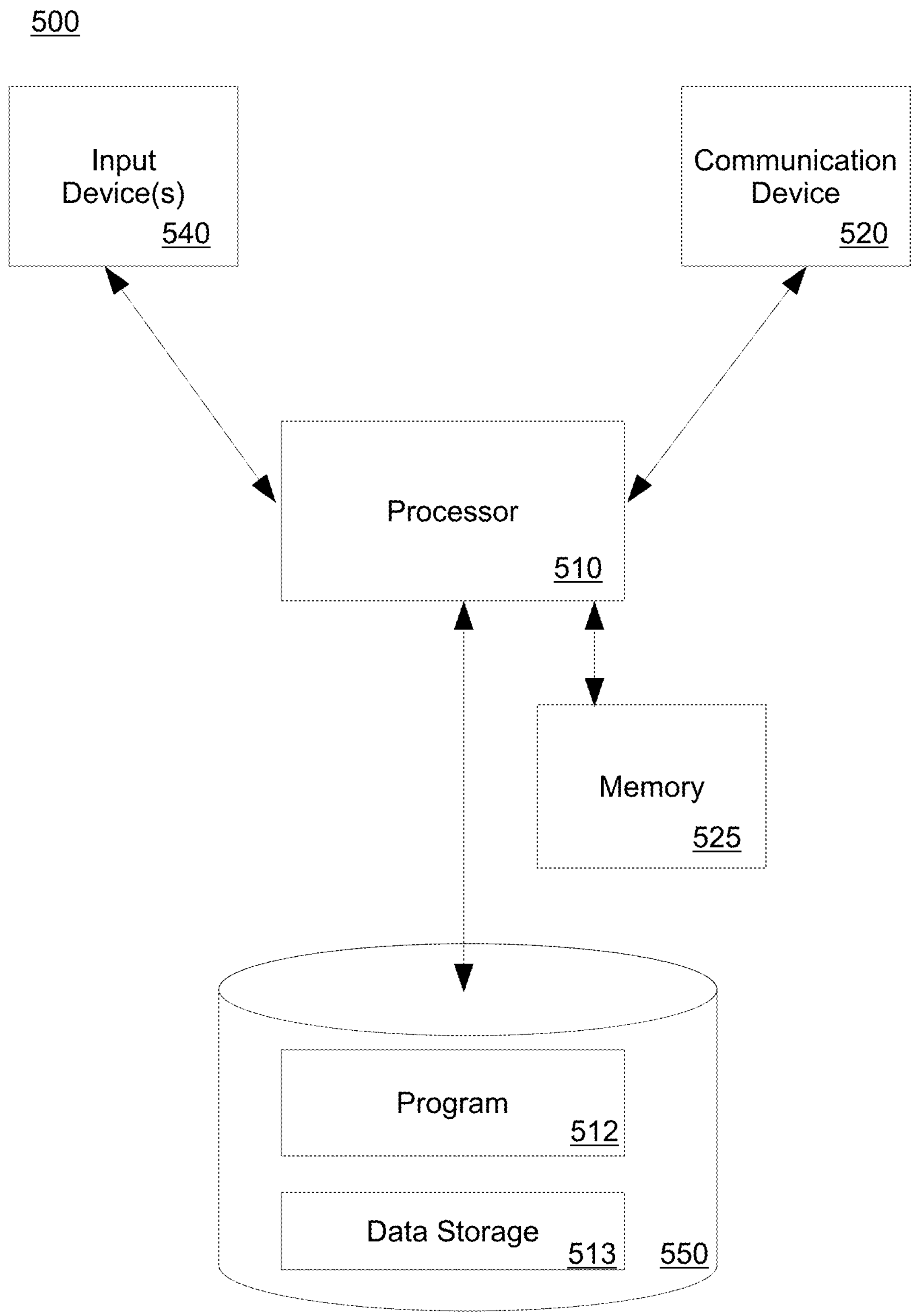
FIG. 5 illustrates a motion controller in accordance with some embodiments.

Now referring to FIG. 1, a method 100 that might be performed an onboard monitoring device, such as the device described with respect to FIG. 5, is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 100 may relate to predicting when maintenance will be required for an apparatus such as a shear valve or a pump. Predicting when maintenance will be required allows a user to easily swap or replace a shear valve, or pump, that is currently in use before a leak or other damage occurs. For example, even when a valve or pump is not leaking, its performance may be degraded which can lead to performance issue or mechanical breakdowns of a system.

Now referring to 110, a force in a valve or a pump may be monitored via an onboard motion controller. In some embodiments, the force may comprise a vertical force that is applied between a rotor and a stator. In some embodiments, the force may comprise a force may comprise a vertical force applied between a shaft and a stop.

For example, the valve or pump may be monitored via a motion controller, such as a motion controller described with respect to FIG. 5. The motion controller may use a measured value as an indication of a relative torque required to rotate, or push, a load on a motor. This initial measured value may be recorded with every subsequent initialization value from the processor (e.g., a value from a StallGuard™ software) and these values may be tracked. In other words, a relative torque value may be measured and that value, and any decreases by a pre-determined percentage value of an original measured value, may be stored in a wear log. If the measured value falls below an acceptable range, an indication will be sent that the valve or pump should be serviced.

For purposes of illustrating features of the present embodiments, some examples will now be introduced and referenced throughout the disclosure. Those skilled in the art will recognize that these examples are illustrative and are not limiting and are provided purely for explanatory purposes.

Figure 3:
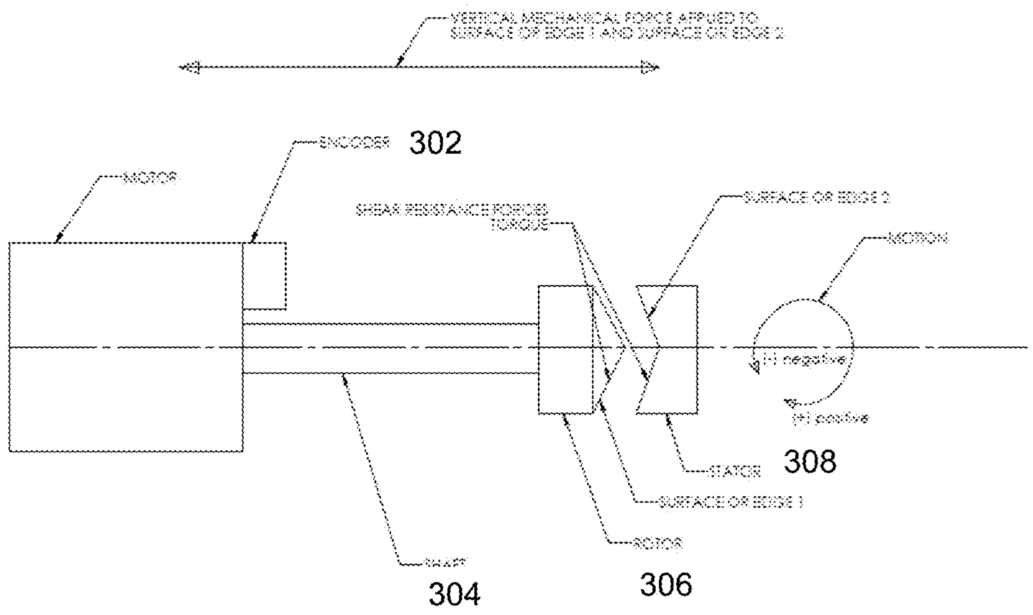
FIG. 3 illustrates a valve in accordance with some embodiments.

In a first example, and referring to FIG. 3, an embodiment of a shear valve 300 is illustrated. The shear valve 300 may comprise a shaft 304 that holds (e.g., pushes) a rotor 306 onto a stator 308 so that the rotor 306 and stator 308 can be in fluid communication with each other and without leaking. This may be accomplished by a downward force of the shaft 304 on the rotor 306 via a mechanical device such as, but not limited to, one or more springs. However, springs may wear as time and use continue, thus the springs may weaken causing there to be less force to hold the rotor 306 on to the stator 308. The force may be measured and monitored by encoder 302 which functions as a motion controller. When the rotor and stator are rotated there is both a vertical force as well as a sheer force load relative to the vertical force. Because of vertical force loss there will also be a reduction in shear torque and because of this, changes in current draw which can go up, or down will be apparent.

Figure 4:
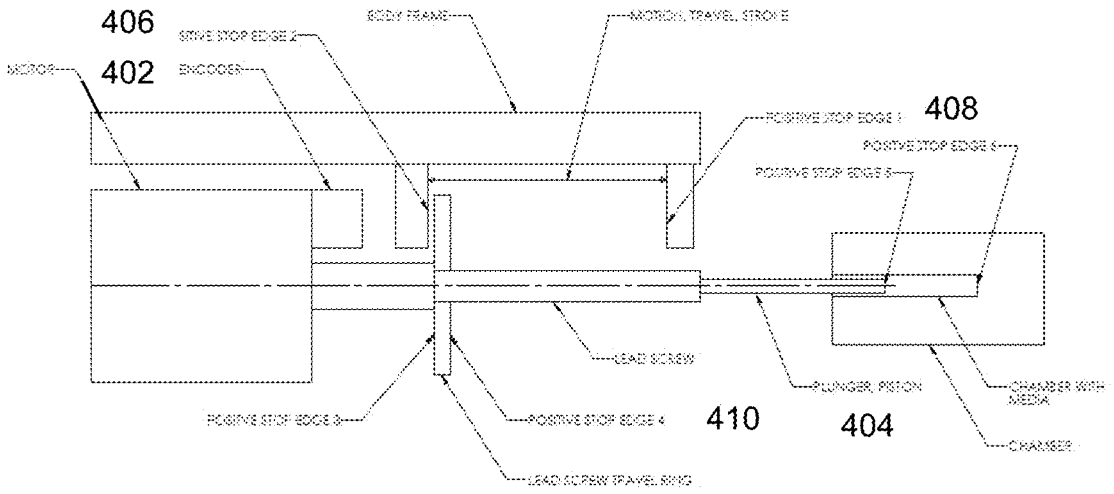
FIG. 4 illustrates a pump in accordance with some embodiments.

In a second example, and referring to FIG. 4, an embodiment of a pump 400 is illustrated. The pump 400 may comprise a shaft 404 (e.g., a plunger or piston) that moves between two stop edges 406/408. The shaft 404 may move between these two stop edges 406 408. A stop 410 that is coupled to the shaft 404 may contact each stop edge 406/408. A force of each contact between stop edge 406 and stop 410 may be measured. Likewise, a force of each contact between stop edge 408 and stop 410 may be measured. The force may be measured and monitored by encoder 402 which functions as a motion controller. In some embodiments, a stop typically refers to a mechanical device or feature that restricts movement to a predetermined position, ensuring accuracy or preventing overtravel in a mechanism or system.

A stop may also be considered a mechanism where a predetermined force is applied to bring a moving part to a halt at a specific position, ensuring accuracy or controlled positioning. A stop helps prevent excessive force or impact during the stopping process. In the present embodiments, an encoder is used to detect or measure stopping conditions, potentially to initiate a stopping mechanism and prevent or limit impact forces. Measured values are then reported to the StallGuard™ software.

For a pump, the StallGuard™ software is tracking motion traveled via a screw/shaft. When the disc on a screw/shaft hits a stop, the StallGuard™ software measures the increase in current on the motor. It measures precisely enough to know that the screw/shaft is switching direction. Since every screw is different the StallGuard™ software may adjust for the variations in the screw/shaft.

Referring back to FIG. 1, at 120, a change in a current draw associated with (i) a motor moving a rotor in the valve or (ii) a shaft in the pump is determined. Current draw may be calculated based on the measure of the force as described with respect to 110. In some embodiments regarding a shear valve, determining a change in current draw may be further based on a temperature of the rotor and stator as well as backlash associated with the rotor changing directions.

Figure 2:
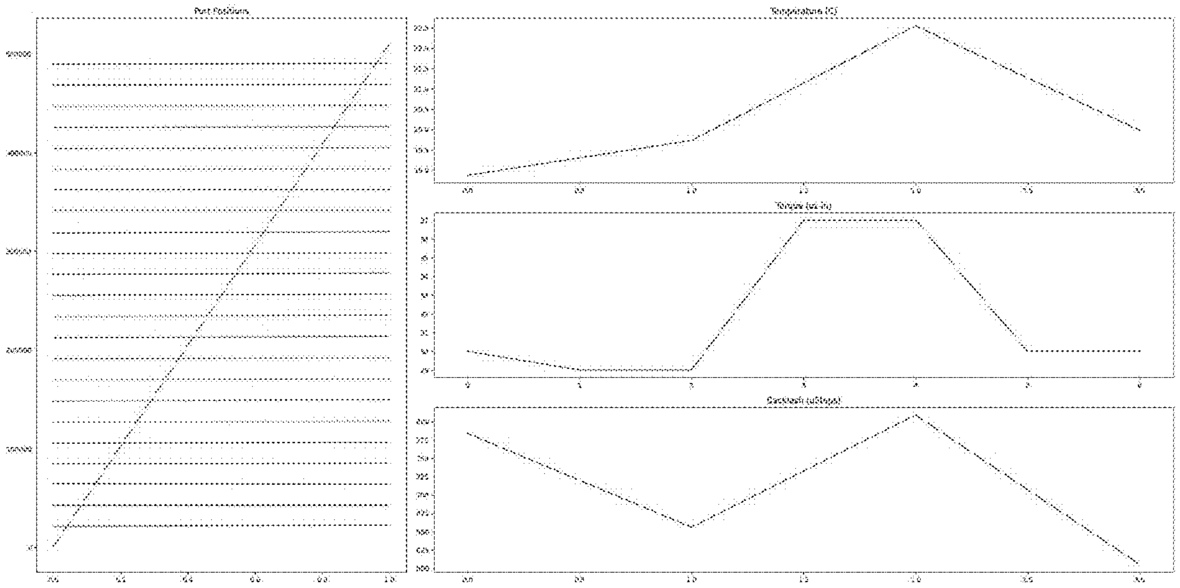
FIG. 2 illustrates graphs indicating valve information in accordance with some embodiments.

Determining the change in current draw based on a temperature of the rotor and stator and backlash may be determined by (i) running a first verification process (e.g., an initialization process), (ii) increasing friction temperature in the valve by rotating the valve, (iii) resting the valve to cool down the valve and (iv) running a second verification process. At this point shear torque values associated with the valve from the first verification process and from the second verification process may be compared. Examples of the backlash values and temperature values as they are plotted are illustrated in FIG. 2. Looking at the backlash data, and depending on temperature, a gap associated with going in different directions may predicts maintenance if the peaks and valleys become deeper. This change in data functions as a need for maintenance indictor. Increases in temperature beyond normal are also a need for maintenance indicator. Calculating force based on current draw and on temperature may also be accomplished by a load measuring software such as, but not limited to, StallGuard™ The load measuring software may comprise a sensorless load measurement designed for stepper motors (i.e., stall detection technology).

Continuing with the above examples, a change in a current draw associated with a motor moving the rotor in the valve of FIG. 3 may be calculated. Similarly, a change in a current draw associated with a motor moving the shaft of the pump FIG. 4 may be calculated.

Determining if the change in current draw is within an acceptable range occurs at 130 of FIG. 1. The acceptable range may be based on the size of the motor in the shear valve or pump. As various pumps and shear valves are needed for different applications, a size of the motor, and associated current draw, may be based on the application and/or the physical power of the motor. In a case that the change in current draw is within the acceptable range, the force is continued to be monitored at 140. In a case that the change in current draw is outside of the acceptable range, an indication is transmitted to a user at 150.

The indication transmitted to the user may comprise an indication of a potential leak in the valve or performance degradation associated with the pump. Based on the transmitted indication, a user may replace, or schedule to replace, a valve or pump before it has a catastrophic failure or degrades to such a point that its performance can harm another system. In some embodiments, the indication transmitted to the user may be further based on measuring port alignment accuracy that comprises instructing the valve to go to each and every port (e.g., rotate to port 1, rotate to port 2, rotate to port 3, etc.) and then tracking the actual location of the valve associated with each assigned port (e.g., how close to port 1 did it get, how close to port 2, etc.). For example, a customer may be provided a script to warm up the valves that opens each port on the valve (e.g., ports 1 to 100 or however many ports are on a particular valve). This script may also function as a way to warm up the valve to test a temperature of the valve. In some embodiments, not every port may be used. For example, in this embodiment, every other port is used (e.g., port 1, port 3, port 5. etc).

Note the embodiments described herein may be implemented using any number of different hardware configurations. For example, FIG. 5 illustrates a motion controller 300 such as encoder 302 or 304, that may be associated with the method 100 of FIG. 1. The motion controller 500 may provide a technical and commercial advantage by being able to monitor a force and convert the monitored and measured force to a current draw that may be used to predict when a valve or pump may require maintenance. Conventional systems may also use an encoder but conventional encoders are placed at an opposite side of a motor and they are connected to additional or external sensors. In the present embodiments, the encoder is on an opposite side of the motor so that it is closer to the moving components and simply uses the StallGuard™ software instead of additional or external sensors.

The motion controller 500 may comprise a processor 510 ("processor"), such as one or more commercially available Central Processing Units (CPUs) in the form of one-chip microprocessors, coupled to a communication device 520 configured to communicate via a communication network (not shown in FIG. 5). In some embodiments, the processor 510 may comprise a TMC2660 processor or equivalent.

The TMC2660 processor may function as an encoder and may comprise an integrated micro-stepping indexer, the sensorless stall detection technology StallGuard™ and a sensorless load dependent current control that may be used to drive a bipolar stepper motor. The TMC2660 processor may comprise an output driver block including low RDSon TrenchFET power MOSFETs configured as full H-bridges to drive the motor windings. The TMC2660 processor may be capable of driving amperage of current from each output. The TMC2660 processor may be designed for a supply voltage of voltage range and may include a SPI interface for configuration and diagnostics and a step and direction interface.

The StallGuard™ software may allow for the detection of motor stalls or lost steps without the need for additional sensors by using feedback from the motor to sense changes in load conditions. This allows the system to adapt and or prevent stalls during operation. StallGuard™ may calculate the changes in current in the motor and then create numbers that go up or go down based on that power draw. Power draw is relative to the shear radial motion and its these values that may be analyzed. These values are then converted into other units of measurement such as, but not limited to, Newton-meters (Nm) or foot-pounds (ft-lb). These values are then converted into inch/oz or inch/pounds measurements for calibration. In some embodiments, a bandwidth of acceptable values may be programmed into the valve or pump.

As indicated above, the processor 510 may further function as an encoder. The encoder may be used to monitor position, speed, or direction of motion in devices, for example shear valves or pumps driven by motors. Using StallGuard™ in combination with an encoder can detect positive or negative motion vertical or circular and track all changes for material wear on rotors, stators, plungers, shafts, pistons, screws, unions as well as other components. Another advantage of the processor 510 is that it can handle both motor control and motion control.

In some embodiments, two or more integrated circuit chips may be used to function as the processor. For example, in this embodiment, one integrated circuit chip may be used for monitoring the motor and fluctuations in current and another integrated chip may be used to monitor motion and a third integrated circuit chip may be used to monitor what is happening within the valve.

The communication device 520 may be used to communicate, for example, with one or more machines on a network (e.g., a technician or other alerting software). The motion controller 500 further includes an input 540 to accept programming from a user.

The processor 510 also communicates with a memory 525 and storage device 550 that stores data 513. The storage device 550 may comprise any appropriate information storage device, including combinations of magnetic storage devices (e.g., a hard disk drive), optical storage devices, mobile telephones, and/or semiconductor memory devices. The storage device 550 may store a program 512 and/or processing logic for controlling the processor 510. The processor 510 performs instructions of the program 512, and thereby operates in accordance with any of the embodiments described herein. For example, the processor 510 may receive data and send an alert that maintenance of a pump or valve may be required.

The program 512 may be stored in a compiled, compressed, uncompiled and/or encrypted format or a combination. The program 512 may furthermore include other program elements, such as an operating system, a database management system, and/or device drivers used by the processor 510 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A method comprising:

operating a valve;

monitoring a vertical force between a rotor and a stator in a valve via an onboard motion controller by determining a change in a current draw associated with a motor moving the rotor in the valve;

determining if the change in current draw is within an acceptable range;

in a case that the change in current draw is within the acceptable range, continue monitoring the vertical force; and in a case that the change in current draw is outside of the acceptable range, transmit an indication to a user.

2. The method of claim 1, wherein the indication transmitted to the user comprises an indication of a potential leak in the valve.

3. The method of claim 1, wherein determining the change in the current draw is further based on a temperature of the rotor and the stator and a backlash associated with the rotor changing directions.

4. The method of claim 3, wherein determining the change in the current draw based on the temperature of the rotor and stator and backlash comprises:

running a first verification process;

increasing friction temperature in the valve by rotating the valve;

resting the valve to cool down the valve;

running a second verification process; and comparing shear torque values associated with the valve from the first verification process and from the second verification process.

5. The method of claim 1, wherein the indication to the user is further based on measuring port alignment accuracy comprising instructing the valve to go to each port and tracking the actual location of the valve associated with going to each port.

6. The method of claim 1, further comprising, in response to determining that the change in current draw is outside of the acceptable range, causing the valve to go to each port of the valve and tracking the actual location of the valve associated with going to each port.

7. A system comprising:

a valve comprising a motor, a rotor, and a stator; and an onboard motion controller comprising:

a processor; and a non-transitory computer-readable storage medium storing instructions that when executed by the processor cause the processor to:

monitor a vertical force between the rotor and the stator in the valve by determining a change in a current draw associated with the motor moving the rotor in the valve;

determine if the change in current draw is within an acceptable range;

in a case that the change in current draw is within the acceptable range, continue monitoring the vertical force; and in a case that the change in current draw is outside of the acceptable range, transmit an indication to a user.

8. The system of claim 7, wherein the indication transmitted to the user comprises an indication of a potential leak in the valve.

9. The system of claim 7, wherein determining the change in the current draw is further based on a temperature of the rotor and stator and backlash associated with the rotor changing directions.

10. The system of claim 9, wherein determining the change in the current draw based on a temperature of the rotor and stator and backlash comprises:

running a first verification process;

increasing friction temperature in the valve by rotating the valve;

resting the valve to cool down the valve;

running a second verification process; and comparing shear torque values associated with the valve from the first verification process and from the second verification process.

11. The system of claim 7, wherein the indication to the user is further based on measuring port alignment accuracy comprising instructing the valve to go to each port and tracking the actual location of the valve associated with going to each port.

12. The system of claim 7, wherein the instructions further cause the processor to, in response to determining that the change in current draw is outside of the acceptable range, cause the valve to go to each port of the valve and track tracking the actual location of the valve associated with going to each port.

13. A non-transitory computer-readable medium comprising executable instructions which, when executed by at least one processor, cause the at least one processor to: operate a valve;

monitor a vertical force between a rotor and a stator in the valve by determining a change in a current draw associated with a motor moving the rotor in the valve;

determine if the change in current draw is within an acceptable range;

after determining that the change in the current draw is within the acceptable range, continue monitoring the vertical force; and after determining that the change in the current draw is outside of the acceptable range, transmit an indication.

14. The non-transitory computer-readable medium of claim 13, wherein the indication comprises an indication of a potential leak in the valve.

* * * * *